United States Patent
Xu et al.

(10) Patent No.: US 9,684,353 B2
(45) Date of Patent: Jun. 20, 2017

(54) WEARABLE EQUIPMENT AND MODE SWITCHING METHOD USING THE SAME

(71) Applicants: INVENTEC APPLIANCES (PUDONG) CORPORATION, Shanghai (CN); INVENTEC APPLIANCES CORP., New Taipei (TW); INVENTEC APPLIANCES (NANCHANG) CORPORATION, Jiangxi (CN)

(72) Inventors: Xiao-Long Xu, Jiangxi (CN); Xin Huang, Jiangxi (CN)

(73) Assignees: Inventec Appliances (Pudong) Corporation, Shanghai (CN); Inventec Appliances Corp., New Taipei (TW); Inventec Appliances (Nanchang) Corporation, Jiangxi (CN)

( * ) Notice: Subject to any disclaimer, the term of this patent is extended or adjusted under 35 U.S.C. 154(b) by 76 days.

(21) Appl. No.: 14/704,313

(22) Filed: May 5, 2015

(65) Prior Publication Data
US 2016/0091952 A1    Mar. 31, 2016

(30) Foreign Application Priority Data
Sep. 30, 2014    (CN) .......................... 2014 1 0521722

(51) Int. Cl.
*G06F 1/32*    (2006.01)
(52) U.S. Cl.
CPC .......... *G06F 1/3206* (2013.01); *G06F 1/3215* (2013.01); *G06F 1/3296* (2013.01)

(58) Field of Classification Search
CPC .............................. G06F 1/3206; G06F 1/3296
USPC .................................................. 713/320, 323
See application file for complete search history.

(56) References Cited

U.S. PATENT DOCUMENTS

| | | | |
|---|---|---|---|
| 9,009,516 B1* | 4/2015 | Gabayan | G06F 1/3206 702/141 |
| 2015/0057967 A1* | 2/2015 | Albinali | A61B 5/681 702/150 |
| 2015/0185837 A1* | 7/2015 | Whitney | G06F 3/014 345/156 |
| 2016/0036996 A1* | 2/2016 | Midholt | G06F 1/3206 455/567 |

* cited by examiner

*Primary Examiner* — Chun Cao
(74) *Attorney, Agent, or Firm* — Muncy, Geissler, Olds & Lowe, P.C.

(57) ABSTRACT

A mode switching method of wearable equipment and the wearable equipment are disclosed. The method comprising: confirming a current mode being a sleep mode, detecting an accumulated time of a motion state, judging whether the accumulated time is greater than a first predetermined time period and switching to a fake sleep mode if it is; and detecting an accumulated footsteps and a sleep state, which by judging whether the accumulated footsteps in a second predetermined time period is greater than a threshold footsteps and switching to the motion state if it is; and judging whether the second predetermined time period is experienced in the sleep state and switching to the sleep mode if it is. The present invention can improve the accuracy, while reducing power consumption.

16 Claims, 4 Drawing Sheets a current mode is confirmed as a sleep mode — 101 the accumulated time of the motion state is detected and the accumulated time is judged whether that is greater than the first predetermined time period, if it is, the current mode is switched to the fake sleep mode — 102 the accumulated footsteps and the sleep state are detected for determining the accumulated footsteps in the second predetermined time period is greater than the footsteps threshold, if it is, the current mode is switched to the motion mode if it is. The second predetermined time period is determined in the sleep state, if it is, the current mode is switched to the sleep mode — 103

WEARABLE EQUIPMENT AND MODE SWITCHING METHOD USING THE SAME

FIELD OF THE INVENTION

The present invention relates to an intelligent equipment technology, and in particular to a wearable equipment and mode switching method using the same.

BACKGROUND OF THE INVENTION

Currently, a new concept of wearable equipment is gradually shown, the principle integrates a variety of sensor technologies and wireless transmission technologies. The intelligent device is miniaturized, practiced and can be worn on the human body. For example, the intelligent bracelet is one of wearable equipment, which can collect motion, sleep, body temperature and other information according to the different sensing device in the wearable equipment. The wearable equipment can communicate with wireless mobile device such as mobile phone, tablet, and PDA, etc., or with PC and cloud server to transmit the information of the intelligent bracelet synchronously.

The commonly used wearable equipment includes two functions such as motion monitoring and sleep monitoring, and also provides two methods as following:

First Method:

Fitbit employs the dual-modes. The wearable equipment simultaneously executes the motion monitoring and sleep monitoring for detecting the motion state and sleep state and capturing the motion information and the sleep information. This method simultaneously performs the motion monitoring algorithm and the sleep monitoring algorithm and this method will increase the power consumption of the wearable equipment.

Second Method:

In order to save the power consumption, Jawbone employs the semi-automatic switching method which includes:

When in the sleep monitoring mode, the motion information is collected simultaneously. That is, the footsteps are to be accumulated. If the accumulated footsteps is more than a certain range, the current mode is switched to the motion mode. This method has certain misjudgment. For example, if sleep poorly, turn over too many times, the current mode would be mistaken to switch to the motion mode, and the sleep information data will be lost.

In summary, the drawbacks of the wearable equipment are power consumption and low accuracy.

SUMMARY OF THE INVENTION

It is an objective to provide a mode switching method of a wearable equipment for reducing the power consumption while increasing accuracy.

It is another objective to provide a wearable equipment for reducing the power consumption while increasing accuracy.

According to above objectives, the present invention provides the mode switching method of the wearable equipment. The method includes:

A current mode is confirmed to be a sleep mode. An accumulated time of a motion state is detected for judging whether the accumulated time is greater than a first predetermined time period, and is switched the current mode to a fake sleep mode if it is. An accumulated footsteps and a sleep state is detected for judging whether the accumulated footsteps in the second predetermined time period is greater than a footsteps threshold and switching to a motion mode if it is; and the second predetermined time period is judged whether that is experienced in the sleep state and then the current mode is switched to the sleep mode if it is.

The present invention provides another mode switching method of the wearable equipment, which includes:

A current mode is confirmed to be a sleep mode. A motion amplitude of a motion state is detected for judging whether the motion amplitude is greater than a first predetermined threshold, and is switched to a fake sleep mode if it is. An accumulated footsteps and a sleep state are detected for judging whether the accumulated footsteps in a second predetermined time period is greater than a footsteps threshold and is switched to a motion mode if it is. The second predetermined time period is judged whether that is experienced in the sleep state and is switched to the sleep mode if it is.

The step of the accumulated time is judged whether is greater than the first predetermined time period that includes:

A low sampling frequency is executed for collecting a motion amplitude and the probability of the motion amplitude in the first predetermined time period is greater than an amplitude threshold which is greater than a predetermined probability, and the accumulated time of the motion state is greater than the first predetermined time period.

In addition, a high sampling frequency is executed for detecting the accumulated footsteps and the sleep state, and the high sampling frequency is greater than the low sampling frequency. The sleep state is judged in the second predetermined time period which includes the sleep state is judged to be a deep sleep mode or a shallow sleep state in the second predetermined time period.

After switching to the motion mode, the method further includes:

The high sampling frequency is executed for detecting the motion state to capture the accumulated footsteps, and an initial time of the sleep mode is judges whether is reached and is switched to the sleep mode if it is, else, a manual switching instruction is received to switch to the sleep mode.

The step of the current mode is confirmed as the sleep mode which includes:

The initial time of the predetermined sleep mode is reached to switch to the sleep mode, and the current mode is confirmed as the sleep mode, or the manual switching instruction is received to switch to the sleep mode and the current mode is confirmed as the sleep mode.

The wearable equipment of the present invention includes a sleep mode capturing unit, a first switching unit and a second switching unit. The sleep mode capturing unit confirms a current mode that is a sleep mode and sends an executing instruction to the first switching unit. The first switching unit receives the executing instruction from the sleep mode capturing unit, detects an accumulated time of a motion state and judges whether the accumulated time is greater than a first predetermined time period, and switches to a fake sleep mode and sends the executing instruction to the second switching unit if it is. The second switching unit receives the executing instruction from the first switching unit, detects an accumulated footsteps and a sleep state, and judges whether the accumulated footsteps in a second predetermined time period is greater than a footsteps threshold, and switches to a motion mode if it is. The second switching unit also judges whether the second predetermined time period is experienced in the sleep state, and switches to the sleep mode, if it is.

The first switching unit further includes a first switching sub-unit for receiving an executing instruction from the sleep mode capturing unit, executing a low sampling frequency for collecting a motion amplitude, and confirming the accumulated time of the motion state being greater than an amplitude threshold which is greater than a predetermined probability.

The second switching unit includes a second switching sub-unit for receiving an executing instruction from the first switching unit, executing a high sampling frequency for detecting the accumulated footsteps and the sleep state, in which the high sampling frequency is greater than the low sampling frequency. The second switching unit judges whether the accumulated footsteps in the second predetermined time period is greater than the footsteps threshold, and switches to the motion mode if it is. The second switching unit judges whether the second predetermined time period is experienced in a deep sleep state or in a shallow sleep state and switches to the sleep mode if it is.

The wearable equipment further includes a third switching unit to which the second switching unit sends an executing instruction after the second switching unit switches to the motion mode. The third switching unit receives the executing instruction from the second switching unit and executes the high sampling frequency for detecting the motion state for capturing the accumulated footsteps. The third switching unit judges whether the initial time of the sleep mode is reached and switches to the sleep mode if it is or receives a manual switching instruction to switch to the sleep mode.

The sleep mode capturing unit includes a conforming sub-unit for confirming the current mode being the sleep mode by the predetermined initial time of the sleep mode is reached to switch to the sleep mode, or confirming the current mode that is the sleep mode by the manual switching instruction is received to switch to the sleep mode.

According to above aspects, the method of the present invention confirms a current mode that is a sleep mode, detects an accumulated time of the motion state, judges whether the accumulated time is greater than a first predetermined time period and switches to a fake sleep mode if it is. The present invention sets a fake sleep mode as an intermediate state identification. The accumulated time is greater than a predetermined time period to switch to a fake sleep mode. The intermediate state both collects the motion state and the sleep mode for the fake sleep mode of the intermediate state identification. Thus, the power consumption sustained can be prevented by turning on the motion mode and the sleep mode simultaneously, and for the fake sleep mode of the intermediate state identification, the chance of erroneous switching can be reduced to improve the accuracy.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

For the objective, technical, and advantages of this invention are more clear and understand, the following illustrated examples is accompanying with drawings to describe the present invention in further detail.

In the current technology, when the wearable equipment utilizes a dual-mode program, the power consumption of the wearable equipment will be increased. When using the semi-automatic switching program, the motion information is simultaneously collected in the sleep mode monitor to switch to the motion mode based on the accumulated footsteps. It will result in a higher misjudgment. In order to solve above problems, the present invention increases the fake sleep mode. In the sleep mode, when the accumulated time of the motion state is over a predetermined range, the fake sleep mode is to be executed. For combining the fake sleep mode to identify the intermediate state, the intermediate state takes into account the information collection for the motion and the sleep. Further, the power consumption can be decreased, the accuracy is to be increased and also meets the requirements of the wearable equipment.

Figure 1:
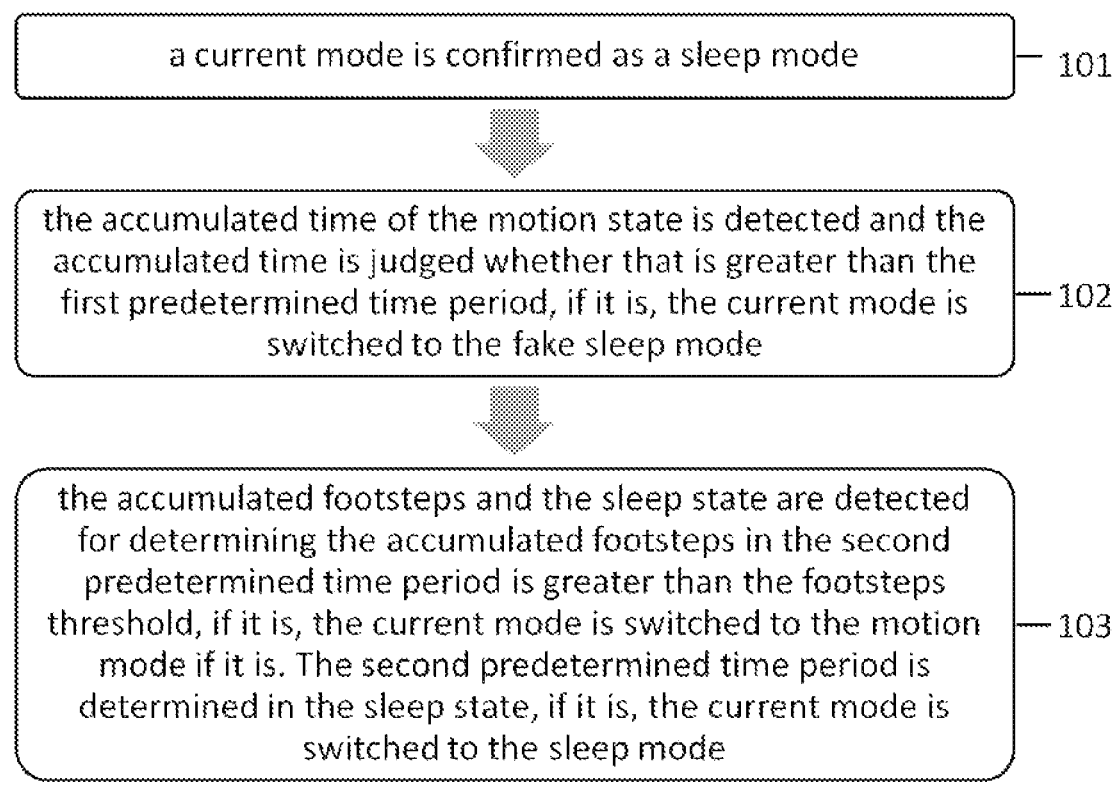
FIG. 1 is a flow chart of showing a mode switching method of a wearable equipment in accordance with the present invention.

Please refer to FIG. 1. FIG. 1 is a flow char of the mode switching method of the wearable equipment, includes the step 101~step 103 of:

Step 101: a current mode is confirmed to be a sleep mode.

For the variety cases of confirming the sleep mode such as for the case of the predetermined initial time of the sleep mode, the predetermined initial time of the sleep mode is reached to switch to the sleep mode and the current mode is confirmed as the sleep mode. Further, for the case of the manual switching, the manual switching instruction is received to switch to the sleep mode, and the current mode is confirmed as the sleep mode.

Step 102: the accumulated time of the motion state is detected and the accumulated time is judged whether that is greater than the first predetermined time period, if it is, the current mode is switched to the fake sleep mode.

In the sleep mode, the wearable equipment will perform a sleep detection for capturing the sleep information, in which the sleep information such as a shallow sleep state and deep sleep state. In the sleep mode, the present invention also detects the motion state for capturing the accumulated time of the motion state. If the accumulated time is greater than the first predetermined time period, the current mode is switched to the fake sleep mode, and the accumulated time is not greater than the first predetermined time period, and the wearable equipment continues to detect the subsequent motion state.

The first predetermined time period can be set as required, for example, the first predetermined time period is 60 seconds.

The wearable equipment is a motion state at a time that can be determined according to the application. For example, the sensing device in the wearable equipment for capturing the time of the motion information, and the motion information such as velocity, acceleration and so on. If the motion information is greater than the predetermined threshold, the wearable equipment is to be confirmed as the motion state in a time.

Specifically, the steps also can be performed as follows:

The low sampling frequency is executed for collecting a motion amplitude and if the probability of the motion amplitude in the predetermined time period is greater than the first predetermined time period which is greater than the predetermined probability, and the accumulated time of the motion state is greater than the first predetermined time period that can be confirmed. If the low sampling frequency is lower than the sampling frequency of the motion mode, the sampling frequency of the sleep mode can be employed, such as 1 Hz-2 Hz. The predetermined probability such as 100%, 90% and so on.

In practice, when the current mode is confirmed as the sleep mode, any sampling time in the sleep mode is set as an initial time. If the probability of the motion amplitude is greater than the amplitude threshold in the first predetermined time period which is greater than the predetermined probability, the accumulated time of the motion state is greater than the first predetermined time period which can be confirmed.

If the sleep mode is turned on at 12 o'clock, sampling is performed in every second. That is, the sampling time is 12:00:01, 12:00:02, 12:00:03, . . . . Each sampling time is set as an initial time. If the probability of the motion of motion within the subsequent 60 seconds is greater than the amplitude threshold which is greater than a predetermined probability, the accumulated time of the motion state is greater than 60 seconds which can be confirmed. For example, the subsequent 60 seconds after 12:00:07, the probability of the motion amplitude is greater than the amplitude threshold which is greater than the predetermined probability, and the current mode is switched to the fake sleep mode at 12:01:08.

Step 103: the accumulated footsteps and the sleep state are detected for determining the accumulated footsteps in the second predetermined time period is greater than the footsteps threshold, if it is, the current mode is switched to the motion mode. The second predetermined time period is determined in the sleep state, if it is, the current mode is switched to the sleep mode.

In the fake mode, the wearable equipment still detects the sleep state and the accumulated footsteps. Specifically, the high sampling frequency is executed for detecting the accumulated footsteps and the sleep state, and the high sampling frequency is greater than above the low sampling frequency. The present invention utilizes the sampling frequency of the specific motion mode as a high sampling frequency, such as 16 Hz-50 Hz. Furthermore, in the fake sleep mode, the "motion detecting mechanism" is first used for determining whether the state is the motion state or in the relatively static state as so to determine the use of the high sampling frequency and low sample frequency. Specifically, although the fake sleep mode can detect the accumulated footsteps and the sleep state, but the wearable equipment is determined as the relatively static by the motion detecting mechanism, the user cannot be walked, such that the fake sleep mode did not need to detect the accumulated footsteps with the high sampling frequency, and the wearable equipment only detects the sleep state with the low sampling frequency. For decreasing the power consumption, the low sampling frequency is selected at this time.

The accumulated footsteps in the second predetermined time period is determined which is greater than the footsteps threshold, if it is, the wearable equipment displays the movement of the user is frequently, and then switches to the motion mode, else, detects the subsequent accumulated footsteps. The second predetermined time period is determined whether is in the sleep state, if it is, the wearable equipment displays the user is in the sleep state and switches to the sleep mode, else, detects the subsequent sleep state. The way of the detection of the sleep state is same as that of the sleep mode and the sleep state includes a deep sleep state and a shallow sleep state.

The second predetermined time period can be set as required, for example, the second predetermined time period is 3 minutes.

Specifically, when the current mode is switched to the fake sleep mode, any sampling time is used as the initial time in the fake sleep mode, and the accumulated footsteps in the second predetermined time period is determined which is greater than the footsteps threshold, if it is, the current mode is switched to the motion mode. Then, the current mode in the subsequent second predetermined time period is determined which is in the sleep mode, if it is, the current mode is switched to the sleep mode.

After switching to the motion mode, the method further includes:

The high sampling frequency is executed to detect the motion and capture the accumulated footsteps.

The method is determined to reach the initial time of the sleep mode within the motion mode, if it is, the current mode is switched to the sleep mode, or The manual switching instruction is received under the motion mode and the current mode switches the motion mode to the sleep mode.

In the present invention, the current mode is confirmed as the sleep mode, and the accumulated time of the motion state is detected for determining the accumulated time that is greater than the first predetermined time period and the current mode is switched to the fake sleep mode if it is. The accumulated footsteps and the sleep state are detected to confirm to switch to the motion mode or to the sleep mode. The present invention sets the intermediate state identification is the fake sleep mode. In the sleep mode, when the accumulated time of the motion state exceeds a certain range, the fake sleep mode is to be executed. For the intermediate state identification in the fake sleep mode, the intermediate state can collect the motion information and the sleep information. This, the wearable equipment can prevent the power consumption from turning the motion mode and the sleep mode on simultaneously, and the fake sleep mode is set for identifying the intermediate state to decrease the mistakenly switched to increase the accuracy.

Through the process of FIG. 2 as below, the embodiment of the mode switching method of the wearable equipment will be described, which includes the steps of:

Step 201: the predetermined initial time of the sleep mode is reached to switch to the sleep mode.

In this embodiment, the initial time of the sleep mode is predetermined and the predetermined initial time of the sleep mode is reached and the current mode is switched to the sleep mode and the current mode is confirmed as the sleep mode.

Step 202: the sleep state is to be detected under the sleep mode for capturing the sleep information. At the same time, the low sampling frequency is executed for collecting the motion amplitude if the motion amplitude is greater than the amplitude threshold in 60 seconds, the accumulated time of the motion state is greater than 60 seconds that is to be confirmed and switches to the fake sleep mode.

The low sampling frequency employs the sampling frequency of the sleep mode, and the sampling frequency is 2 Hz.

Step 203: the high sampling frequency is executed for detecting the accumulated footsteps and the sleep mode under the fake sleep mode, and the high sample frequency is greater than the low sampling frequency. The accumulated footsteps within 3 minutes is greater than the footsteps threshold and switches to the motion mode if it is. Step 204: the sleep state is determined is in the deep sleep mode or shallow sleep mode within 3 minutes, and the current mode is switched to the sleep mode if it is.

The sampling frequency of the motion mode is used as the high sampling frequency, and the sampling frequency is 16 Hz.

The accumulated footsteps within 3 minutes is determined whether is greater than the footsteps threshold and the user motion frequent is to be displayed if it is. The footsteps threshold can be set based on the requirement. The accumulated footsteps within 3 minutes is determined which is in the sleep state, if it is, wearable equipment displays the user that is still in the sleep state and the state is static state and switches to the sleep mode. The way of the detection of the sleep state is same as that of the sleep mode.

Step 204: the high sampling frequency is executed for detecting the motion detection under the motion mode and capturing the accumulated footsteps.

Step 205: the motion mode is determined whether is reached the initial time of the sleep mode and the current mode is switched to the sleep mode if it is.

Figure 2:
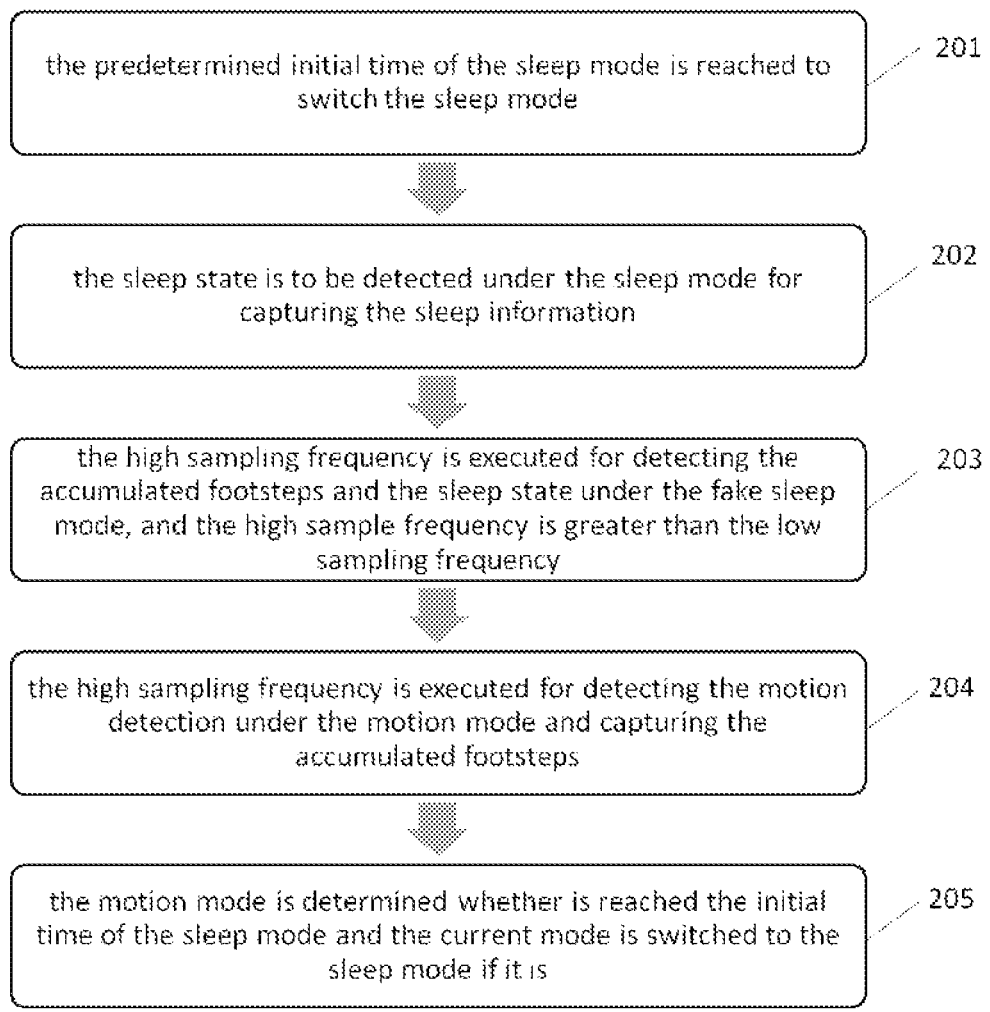
FIG. 2 is a flow chart of showing a first embodiment of a mode switching method of a wearable equipment in accordance with the present invention.
Figure 3:
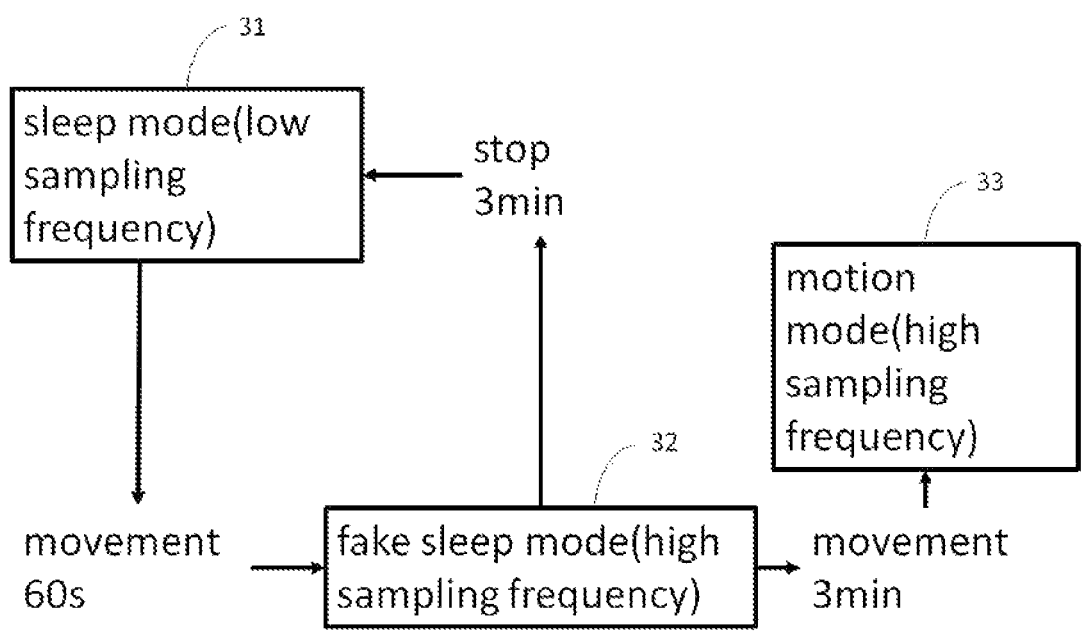
FIG. 3 is a flow chart of showing a second embodiment of a mode switching method of a wearable equipment in accordance with the present invention.

Blow in combine with FIG. 3, a state analysis is performed for the embodiment of FIG. 2:

A. the sampling frequency of the sleep mode 31 is lower, the power consumption is saved but the motion footsteps cannot be monitored.

When the user is in the sleep state, the accumulated motion time for the user under the low sampling frequency is monitored (at this time only for monitoring, but the footsteps cannot be calculated). When the time is over 60 seconds, the wearable equipment is into the fake sleep mode 32.

B. the sampling frequency of the fake sleep mode 32 is same as that of the motion mode 33, and the wearable equipment monitors both the motion mode 33 and the sleep mode 31.

When the user is into the fake sleep mode 32, the wearable equipment employs the pedometer algorithm for monitoring the user movement, if the movement is more than 3 minutes, the user is not in the sleep mode 31 and the wearable equipment switches to the motion mode 33 and stops the pedometer algorithm.

If the user still is more than 3 minutes, the user is only occasionally activities and is into the sleep mode 31. Then the wearable equipment switches to the sleep mode 31 and maintains the ability to switch to the fake sleep mode 32 at any time.

C. for the motion mode 33, the sampling frequency is higher and only for monitoring the motion.

In the present invention, the sampling frequency is very low under the sleep mode 31 (the sampling frequency of the motion mode 33 requires 16-50 Hz, and the sampling frequency of the sleep mode 31 only requires 1 Hz-2 Hz) which can provide the better battery life (ideally, the power consumption can save more than 40%). The intermediate state of the present invention can collect the motion information and the sleep information and auto-switch to the motion mode 33 or the sleep mode 31 according to the user actual action. The probability of the false triggering of the intermediate state is lower, the wearable equipment did not stop the sleep mode 31 while the user appears a little more activity during sleep time, and results in the sleep record was lost overnight.

Figure 4:
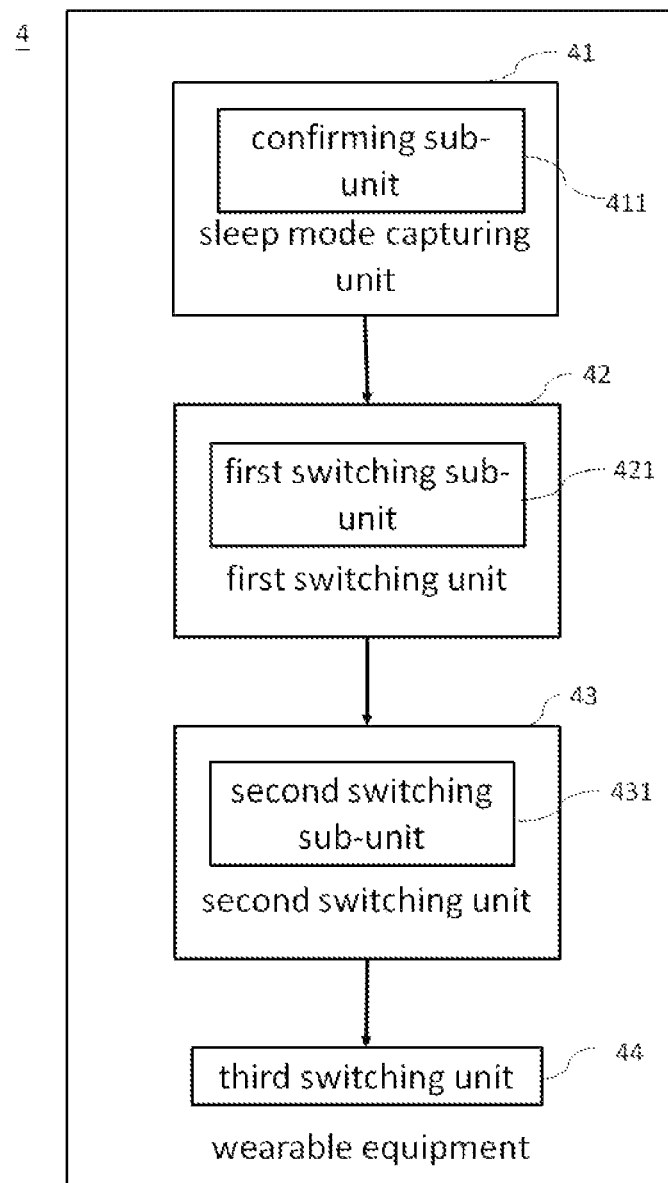
FIG. 4 is a schematic view of showing wearable equipment structure in accordance with the present invention.

Please refer to FIG. 4. FIG. 4 is schematic representation of a structure of the wearable equipment. The wearable equipment 4 includes a sleep mode capturing unit 41, a first switching unit 42 and a second switching unit 43.

The sleep mode capturing unit 41 confirms a current mode as a sleep mode 31 and sends an executing instruction to the first switching unit 42.

The first switching unit 42 receives the executing instruction from the first switching unit 41, detects the accumulated time of the motion state to judge whether the accumulated time is greater than the first predetermined time period and to switch to the fake sleep mode 32 and send an executing instruction to the second switching unit 43 if it is.

The second switching unit 43 receives the executing instruction from the first switching unit 42, detects the accumulated footsteps and the sleep state, and judges the accumulated footsteps in the second predetermined time period is greater than the footsteps threshold, and switches to the motion mode 33 if it is. The accumulated footsteps in the second predetermined time period is determined in a sleep state and the current mode is switched to the sleep mode 31 if it is.

For the variety cases of confirming the sleep mode 31 such as for the case of the predetermining initial time of the sleep mode 31, the predetermined initial time of the sleep mode 31 is reached to switch to the sleep mode 31 and the current mode is confirmed as the sleep mode 31. For case of the manual switching, the second switching unit receives the manual switching instruction to switches to the sleep mode 31 and the current mode is confirmed as the sleep mode 31.

In the sleep mode 31, the wearable equipment 4 will detect form the sleep mode 31 for capturing the sleep information. The sleep information such as the shallow sleep state and the deep sleep state. In the sleep mode 31, the first switching unit 42 further detects the motion state for capturing the accumulated time of the motion state. If the accumulated time is greater than the first predetermined time period, the first switching unit 42 switches the sleep mode 31 to the fake sleep mode 32. If the accumulated time is not greater than the first predetermined time period, the first switching unit 42 continues to detect the subsequent motion state. The first predetermined time period can be set as required such as 60 seconds.

The wearable equipment 4 is in the motion state at a time which can be confirmed based on the application. For example, the sensing device within the wearable equipment 4 captures the motion information at the time. The motion information such as the velocity and the acceleration. If the motion information is greater than the predetermined threshold, and the wearable equipment 4 can be confirmed in the motion state at the time.

The first switching unit 42 further includes a first switching sub-unit 421 for receiving the executing instruction from the sleep mode capturing unit 41 and executes the low sampling frequency for collecting the motion amplitude. If the probability of the motion amplitude in the first predetermined time period is greater than the amplitude threshold which is greater than the predetermined probability, the accumulated time of the motion state is greater than the first predetermined time period which can be confirmed. The low sampling frequency is lower than the sample frequency of the motion mode 33, and the low sampling frequency can specifically employs the sampling frequency of the sleep mode 31 such as 1 Hz-2 Hz. The predetermined probability such as 100%, 90% and so on.

In the fake sleep mode 32, the first switching sub-unit 421 still detects the sleep state and also detects the accumulated footsteps at the same time. Specifically, the high sampling frequency is executed for detecting the accumulated footsteps and the sleep state, and the high sampling frequency is greater than the above low sampling frequency, and the sampling frequency of the motion mode 33 can be employed as the high sampling frequency, such as 16 Hz-50 Hz.

The second switching unit 43 further includes a second switching sub-unit 431 for receiving the executing instruction from the first switching unit 42 and executes the high sampling frequency for detecting the accumulated footsteps and the sleep, and the high sampling frequency is greater than the low sampling frequency. The accumulated footsteps in the second predetermined time period is determined which is greater than the footsteps threshold, if it is, the current mode is switched to the motion mode 33. The second predetermined time period is determined in the deep sleep state or in a shallow sleep state and is switched to the sleep mode 31 if it is.

The wearable equipment 4 further includes a third switching unit 44. After switching to the motion mode 33 by the second switching unit 43, the second switching unit 43 sends an executing instruction to the third switching unit 44.

The third switching unit 44 receives the executing instruction from the second switching unit 43 and executes the high sampling frequency for detecting motion to capture the accumulated footsteps. The initial time of the sleep mode 31 is determined to be reached and the current mode is switched to the sleep mode 31, or the third switching unit 44 receives the manual switching instruction to switch to the sleep mode 31.

The feature is that the sleep mode capturing unit 41 includes the confirming sub-unit 411, the predetermined initial time of the sleep mode 31 is reached to switch the sleep mode 31 and the current mode is confirmed as the sleep mode 31, or the manual switching instruction is received to switch to the sleep mode 31 and the current mode is confirmed as the sleep mode 31.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A mode switching method of wearable equipment, comprising the steps of:
   confirming, by a sleep mode capturing unit, a current mode being a sleep mode;
   detecting an accumulated time of a motion state and a sleep state by a first switching unit; judging, by the first switching unit, whether the accumulated time is greater than a first predetermined time period and switching to a fake sleep mode if it is; and
   detecting an accumulated footsteps and the sleep state by a second switching unit; judging, by the second switching unit, whether the accumulated footsteps in a second predetermined time period is greater than a footsteps threshold and switching to a motion mode if it is; and judging, by the second switching unit, whether the second predetermined time period is experienced in the sleep state and switching to the sleep mode if it is.

2. The mode switching method according to claim 1, wherein the step of detecting the accumulated footsteps and the sleep state comprises:
   executing a high sampling frequency for detecting the accumulated footsteps and the sleep state, wherein the high sampling frequency is greater than a low sampling frequency; and
   wherein the step of judging whether the second predetermined period is experienced in the sleep state comprises judging whether the second predetermined period is experienced in a deep sleep state or a shallow sleep state.

3. The mode switching method according to claim 1, further comprising the following steps after the step of switching to the motion mode:
   executing the high sampling frequency for detecting the motion state to capture the accumulated footsteps; and
   judging whether an initial time of the sleep mode is reached and switching to the sleep mode if it is; or receiving a manual switching instruction to switch to the sleep mode.

4. The mode switching method according to claim 1, wherein the step of confirming the current mode being the sleep mode comprises:
   confirming the current mode being the sleep mode by knowing that the predetermined initial time of the sleep mode is reached to switch to the sleep mode, or confirming the current mode being the sleep mode by knowing that the manual switching instruction is received to switch to the sleep mode.

5. A mode switching method of wearable equipment, comprising the steps of:
   confirming, by a sleep mode capturing unit, a current mode being a sleep mode;
   detecting a motion amplitude of a motion state and a sleep state by a first switching sub-unit; judging whether the motion amplitude is greater than a first predetermined threshold and switching to a fake sleep mode if it is; and
   detecting an accumulated footsteps and the sleep state by a second switching unit; judging, by the second switching unit, whether the accumulated footsteps in a second predetermined time period is greater than a footsteps threshold and switching to a motion mode if it is; and judging, by the second switching unit, whether the second predetermined time period is experienced in the sleep state and switching to the sleep mode if it is.

6. The mode switching method according to claim 5, wherein the step of detecting the accumulated footsteps and the sleep state comprises:
   executing a high sampling frequency for detecting the accumulated footsteps and the sleep state, wherein the high sampling frequency is greater than a low sampling frequency; and
   wherein the step of judging whether the second predetermined period is experienced in the sleep state comprises judging whether the second predetermined period is experienced in a deep sleep state or a shallow sleep state.

7. The mode switching method according to claim 5, further comprising the following steps after the step of switching to the motion mode:
   executing the high sampling frequency for detecting the motion state to capture the accumulated footsteps; and judging whether an initial time of the sleep mode is reached and switching to the sleep mode if it is; or receiving a manual switching instruction to switch to the sleep mode.

8. The mode switching method according to claim 5, wherein the step of confirming the current mode being the sleep mode comprises:
confirming the current mode being the sleep mode by knowing that the predetermined initial time of the sleep mode is reached to switch to the sleep mode, or confirming the current mode being the sleep mode by knowing that the manual switching instruction is received to switch to the sleep mode.

9. A wearable equipment comprises a sleep mode capturing unit, a first switching unit, and a second switching unit, wherein,
the sleep mode capturing unit confirms a current mode being a sleep mode and sends an executing instruction to the first switching unit;
the first switching unit receives the executing instruction from the sleep mode capturing unit, detects an accumulated time of a motion state, and judges whether the accumulated time is greater than a first predetermined time period, and switches to a fake sleep mode and sends the executing instruction to the second switching unit if it is; and
the second switching unit receives the executing instruction from the first switching unit, detects an accumulated footsteps and a sleep state, and judges whether the accumulated footsteps in a second predetermined time period is greater than a footsteps threshold, and switches to a motion mode if it is; and judges whether the second predetermined time period is experienced in the sleep state, and switches to the sleep mode if it is.

10. The wearable equipment according to claims 9, wherein the sleep mode capturing unit includes a confirming sub-unit for confirming the current mode being the sleep mode by knowing that the predetermined time of the sleep mode is reached to switch to the sleep mode, or confirming the current mode being the sleep mode by knowing that the manual switching instruction is received to switch to the sleep mode.

11. The wearable equipment according to claim 9, wherein the first switching unit further comprises a first switching sub-unit for receiving the executing instruction from the sleep mode capturing unit, executing a low sampling frequency for collecting a motion amplitude, and confirming the accumulated time of the motion state being greater than the first predetermined time period if the probability of the motion amplitude in the first predetermined time period being greater than an amplitude threshold is greater than a predetermined probability.

12. The wearable equipment according to claims 11, wherein the sleep mode capturing unit includes a confirming sub-unit for confirming the current mode being the sleep mode by knowing that the predetermined time of the sleep mode is reached to switch to the sleep mode, or confirming the current mode being the sleep mode by knowing that the manual switching instruction is received to switch to the sleep mode.

13. The wearable equipment according to claim 11, wherein the second switching unit comprises a second switching sub-unit for receiving the executing instruction from the first switching unit, executing a high sampling frequency for detecting the accumulated footsteps and the sleep state, wherein the high sampling frequency is greater than the low sampling frequency;
judging whether the accumulated footsteps in the second predetermined time period is greater than the footsteps threshold, and switching to the motion mode if it is; and
judging whether the second predetermined time period is experienced in a deep sleep state or in a shallow sleep state, and switching to the sleep mode if it is.

14. The wearable equipment according to claims 13, wherein the sleep mode capturing unit includes a confirming sub-unit for confirming the current mode being the sleep mode by knowing that the predetermined time of the sleep mode is reached to switch to the sleep mode, or confirming the current mode being the sleep mode by knowing that the manual switching instruction is received to switch to the sleep mode.

15. The wearable equipment according to claim 13, further comprising:
a third switching unit, the second switching unit sends the executing instruction to the third switching unit after the second switching unit switches to the motion mode;
the third switching unit receives the executing instruction from the second switching unit and executes the high sampling frequency for detecting the motion state to capture the accumulated footsteps; and
the third switching unit judges whether the initial time of the sleep mode is reached and switches to the sleep mode if it is or receives a manual switching instruction to switch to the sleep mode.

16. The wearable equipment according to claims 15, wherein the sleep mode capturing unit includes a confirming sub-unit for confirming the current mode being the sleep mode by knowing that the predetermined time of the sleep mode is reached to switch to the sleep mode, or confirming the current mode being the sleep mode by knowing that the manual switching instruction is received to switch to the sleep mode.

* * * * *